(12) United States Patent
Pyre et al.

(10) Patent No.: US 11,739,797 B2
(45) Date of Patent: Aug. 29, 2023

(54) CARDAN JOINT SPIDER

(71) Applicant: ARIANEGROUP SAS, Paris (FR)

(72) Inventors: Alain Pyre, Saint Just (FR); Nicolas Luquet, Vernon (FR); Mathias Clain, Vernon (FR)

(73) Assignee: ARIANEGROUP SAS, Paris (FR)

( * ) Notice: Subject to any disclaimer, the term of this patent is extended or adjusted under 35 U.S.C. 154(b) by 941 days.

(21) Appl. No.: 16/529,032

(22) PCT Filed: Feb. 1, 2018

(86) PCT No.: PCT/FR2018/050236
§ 371 (c)(1),
(2) Date: Aug. 1, 2019

(87) PCT Pub. No.: WO2018/142075
PCT Pub. Date: Aug. 9, 2018

(65) Prior Publication Data
US 2020/0072295 A1     Mar. 5, 2020

(30) Foreign Application Priority Data
Feb. 3, 2017   (FR) ...................................... 1750924

(51) Int. Cl.
*F16D 3/40*       (2006.01)
*F02K 9/00*       (2006.01)

(52) U.S. Cl.
CPC .................. *F16D 3/40* (2013.01); *F02K 9/00* (2013.01); *F05D 2240/90* (2013.01); *F16D 2300/12* (2013.01); *Y10T 403/7194* (2015.01)

(58) Field of Classification Search
CPC ............... Y10T 403/34; Y10T 403/341; Y10T 403/342; Y10T 403/347; Y10T 403/32041; Y10T 403/7182; Y10T 403/7194; F01D 25/28; F02K 1/80; F02K 9/00; F02K 9/84; F16D 3/40; F16D 3/2057; F16D 2300/12; F16H 2001/322; B60G 2204/414; A47G 1/1653; F05D 2240/40; F05D 2240/90; F05D 2230/51
USPC ....................................... 403/396; 248/220.1
See application file for complete search history.

(56) References Cited

U.S. PATENT DOCUMENTS

| 272,339 | A |   | 2/1883  | Shuman |
|---|---|---|---|---|
| 939,005 | A | * | 11/1909 | Goedeke .................. B65D 9/34 248/300 |
| 3,045,647 | A | * | 7/1962  | Bristle ................. A01K 13/004 119/661 |

(Continued)

FOREIGN PATENT DOCUMENTS

| DE | 102013107679 A1 |   | 1/2015  |
|---|---|---|---|
| GB | 1231499 A       |   | 5/1971  |
| RU | 2568960 C1      | * | 11/2015 |

OTHER PUBLICATIONS

International Search Report dated Jun. 4, 2018, in International Application No. PCT/FR2018/050236 (4 pages).

*Primary Examiner* — Matthew R McMahon
(74) *Attorney, Agent, or Firm* — Bookoff McAndrews, PLLC

(57) ABSTRACT

A cardan joint spider comprising a body having four right-angled brackets, each bracket presenting two mutually perpendicular arms, the arm of one bracket being assembled to the arm of an adjacent bracket so as to form a cross-shaped spider having four branches.

8 Claims, 3 Drawing Sheets

(56) References Cited

U.S. PATENT DOCUMENTS

| | | | | |
|---|---|---|---|---|
| RE25,623 E | * | 7/1964 | Bristle | A01K 13/004 403/177 |
| 3,169,613 A | | 2/1965 | Webb et al. | |
| 4,219,285 A | * | 8/1980 | Hayashi | F16B 12/32 403/231 |
| 5,127,759 A | * | 7/1992 | Orbom | E04B 1/1903 403/171 |
| 5,918,998 A | * | 7/1999 | Pourmand | E04B 1/2604 403/171 |
| 6,170,258 B1 | * | 1/2001 | Katorgin | F02K 9/42 60/257 |
| 6,846,242 B1 | * | 1/2005 | Rivera | F16D 3/40 464/112 |
| 2004/0101354 A1 | * | 5/2004 | Nakahori | F16B 7/0426 403/169 |

* cited by examiner

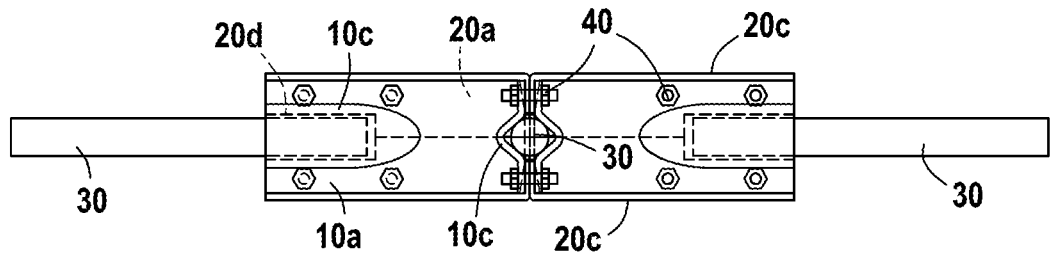
FIG.3
FIG.4
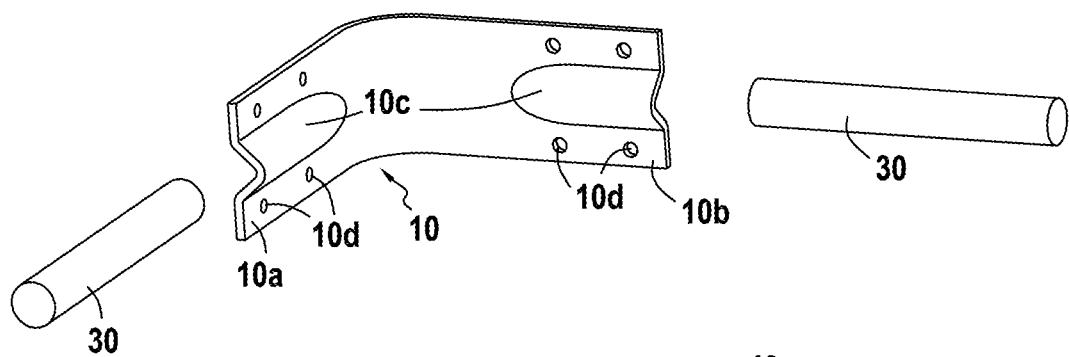
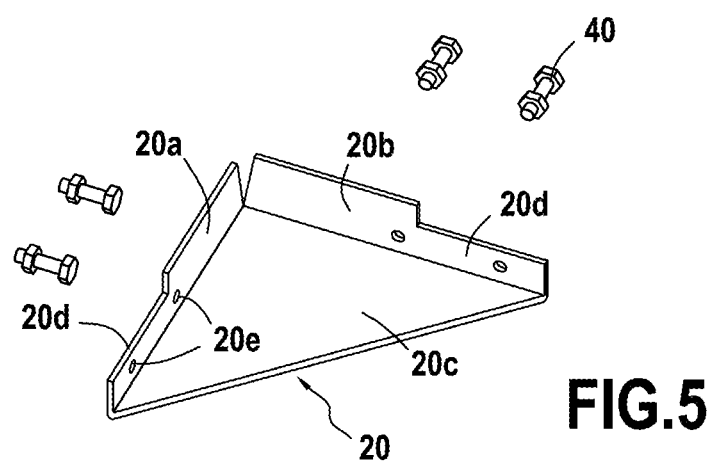
FIG.5

CARDAN JOINT SPIDER

CROSS-REFERENCE TO RELATED APPLICATIONS

This application is the U.S. national phase entry under 35 U.S.C. § 371 of International Application No. PCT/FR2018/050236, filed on Feb. 1, 2018, which claims priority to French Patent Application No. 1750924, filed on Feb. 3, 2017.

FIELD OF THE INVENTION

The present invention relates to the field of mechanical hinges used in engines, in particular in aeroengine or rocket engines, and more specifically it relates to cardan joint spiders used in such engines.

STATE OF THE PRIOR ART

In a space vehicle, rocket engines are generally mounted on a cardan joint including a spider. Such a cardan joint spider is subjected to high levels of mechanical stress. Known cardan joint spiders are heavy parts made of forged metal or of single-piece castings, in order to withstand such stresses. Nevertheless, the methods used for manufacturing such parts are often complicated, and run the risk of defects being present in the final parts. Furthermore, known cardan joint spiders are generally parts that are heavy and expensive. There therefore exists a need on these lines.

SUMMARY OF THE INVENTION

An embodiment provides a cardan joint spider comprising a body having four right-angled brackets, each bracket presenting two mutually perpendicular arms, the arm of one bracket being assembled to the arm of an adjacent bracket so as to form a cross-shaped spider having four branches.

It can be understood that the spider presents two perpendicular axial directions, each extending parallel to two branches of the spider. A center of the spider is formed at the intersection between the two axial directions of the spider. Furthermore, the axial directions extend in a common plane, this plane being referred to below as the "spider plane". When installed in a cardan joint carrying a rocket engine, the spider is subjected to bending stresses and to torsion stresses. Torsion stresses are stresses directed around the direction perpendicular to the spider plane and passing through the center of the spider. Torsion stresses generally tend to deform the branches in the plane of the spider. Bending stresses are stresses directed transversely to the spider plane. Bending stresses tend to deform the branches perpendicularly to the spider plane. Bending stresses may in particular give rise to a phenomenon of the branches twisting relative to each other, in which two perpendicular branches deform in opposite directions perpendicularly to the spider plane.

It can be understood that in each bracket, the two arms are perpendicular to each other to within ±2° at most, where this variation is associated with manufacturing tolerances. Each of the four branches of the spider thus has two arms belonging to two adjacent brackets. In other words each bracket presents a respective arm in each branch of the spider. Each bracket thus has two arms belonging to two perpendicular branches of the spider. The cross-shape of the body of the cardan joint spider is thus obtained merely by assembling together four brackets, thus simplifying manufacture, thereby reducing the risk of defects being present in the final part. Furthermore, this type of structure makes it possible to obtain cardan joint spiders that are lighter in weight than spiders of the prior art.

In certain embodiments, the body includes at least four stiffeners, a stiffener being mounted between the two arms of each bracket.

Each bracket thus has at least one stiffener. The presence of these stiffeners thus serves to improve the stiffness of the spider and to reduce deformations resulting from torsion stresses, in particular by limiting movements of the two arms of each bracket relative to each other in the plane of the spider.

In certain embodiments, each stiffener is fastened to each arm of a bracket by means of at least two bolts.

The term "bolt" is used herein to cover a fastener assembly comprising both a screw and a nut. The at least two bolts are spaced apart from each other along each arm in the axial direction. The bolts serve to hold each stiffener in a fixed position relative to the bracket on which it is mounted. The spacing of two bolts along the arm also serves to improve the bending strength of the spider, and to limit the twisting phenomena caused by those bending stresses. This fastener system using bolts also serves to simplify the process of assembling together the various components making up the cardan joint spider, thus reducing any risk of defects being present in the final part. In addition, the fastener system serves to obtain cardan joint spiders that are lighter in weight than prior art spiders.

In certain embodiments, each stiffener and each arm of a bracket include at least two through holes for passing at least two bolts.

In certain embodiments, said bolts are configured to assemble two adjacent brackets together.

In other words, each bolt serves not only to assemble a stiffener to an arm of a bracket, but it also serves to assemble the arm of said bracket to the arm of an adjacent bracket. This assembly system thus serves to minimize the number of bolts needed for ensuring cohesion and for holding together the components making up the spider. By minimizing the number of bolts, it is possible to minimize the total weight of the spider, and to reduce the risk of defects being present in the final parts.

In certain embodiments, the distance between two bolts through a given arm is greater than or equal to 30% of the length of the arm.

It can be understood that the length of the arm and the distance between two bolts should be considered along an axial direction. Furthermore, said two bolts are not necessarily adjacent, such that other bolts may be interposed between said two bolts. Thus, this distance that is greater than or equal to 30% of the length of the arm specifies the distance between the two bolts through a given arm that are the furthest apart along the axial direction. Spacing the bolts far enough apart presents the advantage of improving the stiffness of the assembly between the brackets and the stiffeners, thereby improving the bending strength of the spider, and limiting the twisting phenomena caused by said torsion stresses. This also distributes torsion forces better.

In certain embodiments, the spider includes four shafts, each branch of the spider carrying a respective shaft mounted between two arms of two adjacent brackets.

It can be understood that when a shaft is mounted between two arms of two adjacent brackets, the axis of said shaft extends in an axial direction. In other words, the axis of each shaft extends in an axial direction of the spider.

By way of example, the shafts may be cylinders of circular section. By way of example, each shaft may be sandwiched between the two arms of two adjacent brackets. Consequently, merely assembling one bracket to another serves to carry and hold a shaft, thereby simplifying the process of assembling the cardan joint spider and limiting its weight.

In certain embodiments, each arm of each bracket includes a portion configured to receive a shaft in part.

The term "in part" is used to mean that when a shaft is mounted between two arms of two adjacent brackets, only a portion of said shaft co-operates with those two arms. The portion that is configured to receive a shaft in part presents the advantage of improving the holding of said shaft when it is mounted between two arms of two adjacent brackets, e.g. by being sandwiched between those two arms, co-operating therewith via complementary shapes. This serves to minimize the total weight of the cardan joint spider, and to reduce the risk of defects being present in the final part.

In certain embodiments, the body has eight stiffeners, with two stiffeners being fastened to each bracket on respective sides of the portion configured to receive a shaft in part, which sides are opposite relative to the axial direction of the shaft.

In other words, two stiffeners are fastened to each bracket on either side of the spider plane. For each bracket, a first stiffener is fastened on one side of the portion configured to receive a shaft in part by means of at least one bolt, and a second stiffener is fastened on the other side of said portion relative to the axial direction by means of at least one bolt. The presence of two stiffeners fastened in this way to each bracket serves to further limit deformation due to bending stresses. This also makes it possible to further increase strength against torsion stresses. The presence of two stiffeners also serves to provide greater uniformity and distribution of forces. Furthermore, having the two stiffeners fastened on either side of the portion that is configured to receive a shaft in part serves to release the space needed for inserting a shaft between the arms of two adjacent brackets. The cross-shaped structure of the cardan joint spider is thus optimized, thereby limiting its weight and reducing the risk of defects being present in the final part.

In certain embodiments, each bracket is made of folded sheet metal.

By way of example, the metal sheet may be shaped in order to obtain a bracket by folding or by pressing. Using metal sheet for making a bracket presents the advantage of being inexpensive, simple to perform and with low risk of obtaining a part that presents defects, and parts that are made out of sheet metal are easier to inspect than inspecting parts made out of single-piece forgings.

The present disclosure also provides a rocket engine including at least one cardan joint spider according to any preceding claim.

BRIEF DESCRIPTION OF THE DRAWINGS

The invention and its advantages can be better understood on reading the following detailed description of various embodiments of the invention given as non-limiting examples. The description refers to the accompanying sheets of figures, in which:

FIG. 3 is a view of the cardan joint spider looking along the axial direction of a shaft;

FIG. 4 is a perspective view of a right-angled bracket; and

FIG. 5 is a perspective view of a stiffener.

DETAILED DESCRIPTION OF EMBODIMENTS

Figure 1:
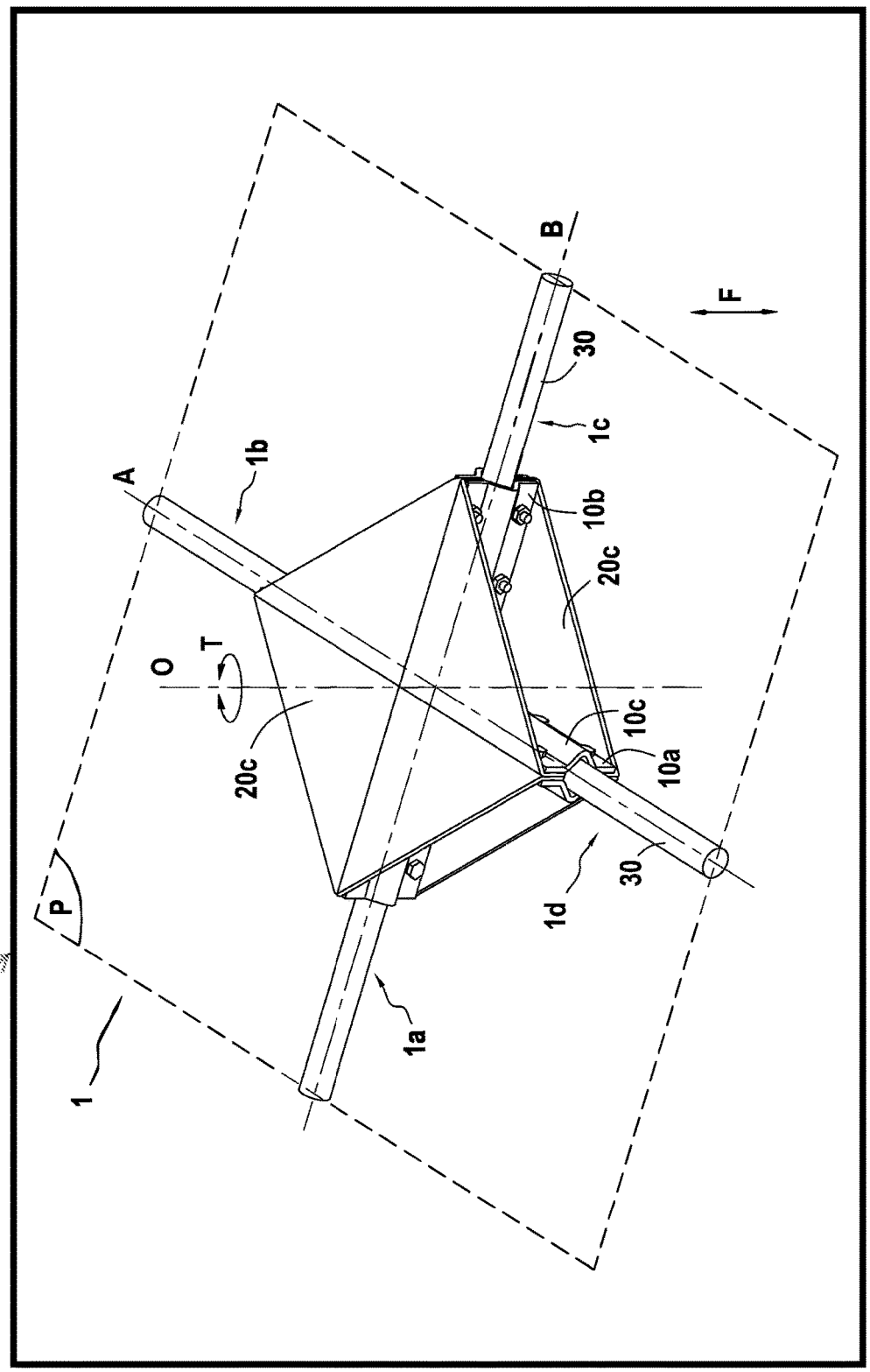
FIG. 1 is a perspective view of a cardan joint spider.
Figure 2:
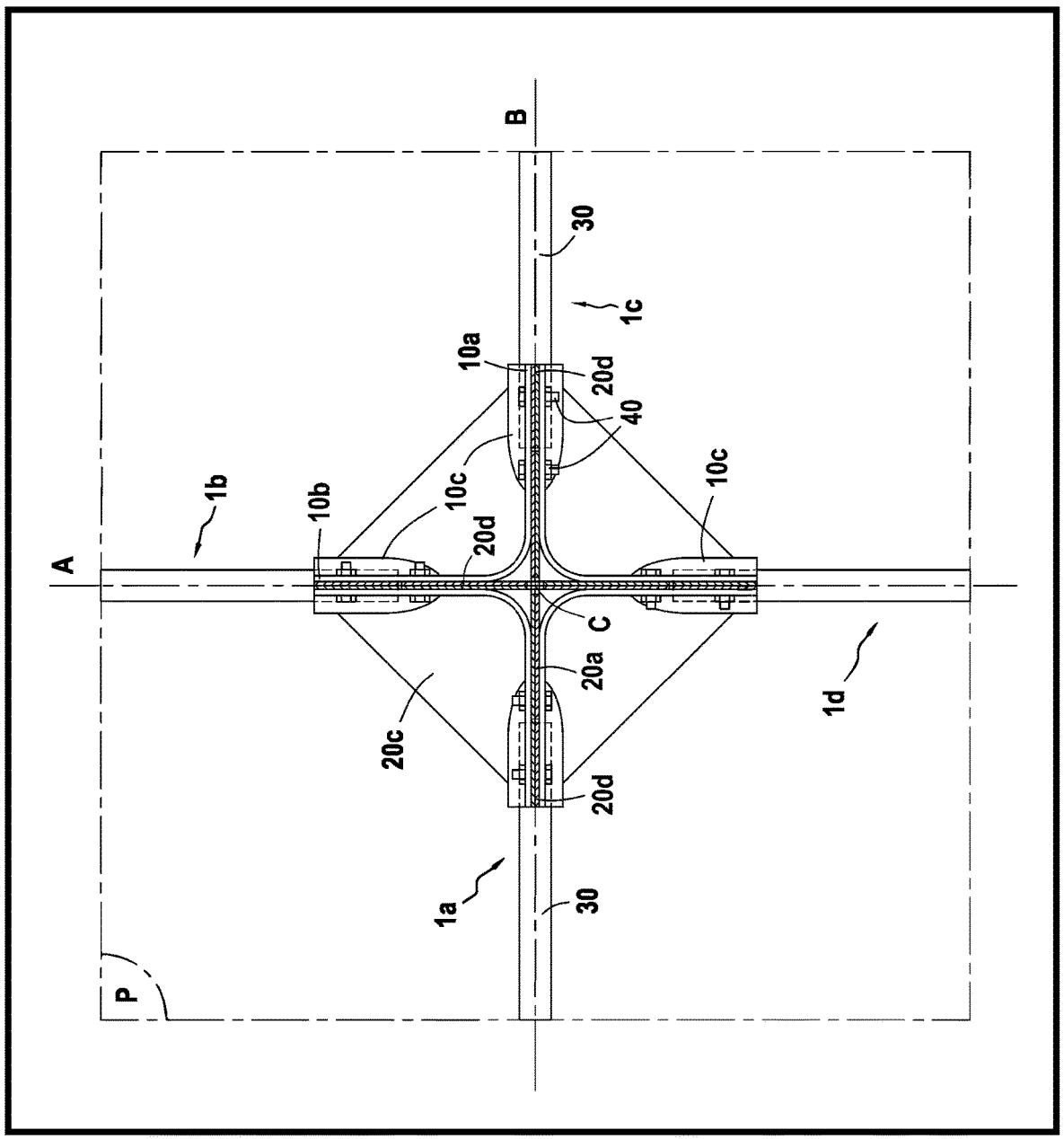
FIG. 2 is a view of the cardan joint spider looking in a direction perpendicular to the plane of the spider, with only four stiffeners being shown.

A cardan joint spider 1 carrying a rocket engine 15 is described with reference to FIGS. 1 to 5. The spider 1 is cross-shaped having four branches 1a, 1b, 1c, and 1d, each branch being perpendicular to the adjacent branch. The spider 1 presents two axial directions A and B each extending parallel to two of the branches of the spider. A center C is formed where the two axial directions A and B of the spider intersect. In addition, the axial directions A and B lie in the common plane P, which plane is referred to below as the "spider plane" P. Torsion stresses T are stresses directed around the direction O perpendicular to the plane P and passing through the center C of the spider. Bending stresses F are stresses directed transversely to the plane P of the spider.

The cardan joint spider has four right-angled brackets 10. Each bracket 10 comprises a first arm 10a connected to a second arm 10b. Between them the first and second arms 10a and 10b form a right angle, and each arm 10a, 10b of each bracket 10 is fastened to an arm 10a, 10b of an adjacent bracket so as to form the four branches 1a, 1b, 1c, and 1d of the spider 1. Each of the first and second arms 10a and 10b also include a portion configured to receive a shaft in part. The portion configured to receive a shaft in part presents a concave portion 10c. The concave portion 10c of each arm is open facing away from the other arm of the bracket. Furthermore, the concave portion 10c occupies at least 40% to 50% of the length of each arm, preferably at least 70%, more preferably at least 90%.

Each bracket 10 also has a plurality of orifices 10d. In this example, each of the first and second arms 10a and 10b has four orifices 10d. In each arm, two pairs of orifices are spaced apart from each other in the axial direction. Each pair of orifices comprises one orifice arranged on one side of the concave portion 10c and another orifice arranged on the other side of the concave portion 10c relative to the plane P of the spider.

Each bracket 10 is made from metal sheet that is shaped by pressing and folding. By way of example, such sheets present a thickness lying in the range 5 millimeters (mm) to 8 mm. By way of example, a sheet that is 6 mm thick corresponds to a spider presenting a length of 162 mm (between the ends of two opposite branches). In addition, they may be made of an alloy based on nickel (i.e. including more than 50% by weight of nickel) or on steel.

A shaft 30 is arranged between the arms of two adjacent brackets 10. In this example, the shafts 30 are cylinders of circular section, such that each shaft 30 is received in part in the concave portion 10c of the arms of said adjacent brackets 10. One end of each of the four shafts 30 is held between the arms of two adjacent brackets. The other end of each of the four shafts 30 extends beyond the arms between which it is to be found. Thus, when the four brackets 10 and the four shafts 30 are assembled together, two shafts 30 lie along the direction A, and two shafts 30 lie along the direction B. In this example, the ends of the shafts 30 that are not held between the arms of two adjacent brackets serve as pivot connections between the cardan joint spider and the yokes of the cardan joint (not shown), when said spider is installed in an engine.

The cardan joint spider 1 also has eight stiffeners 20, with two stiffeners 20 being mounted between the two arms 10a and 10b of each bracket 10, such that: a first stiffener is fastened to the bracket 10 on one side of the concave portion 10c of said bracket 10 and a second stiffener is fastened to said bracket on the other side of said concave portion 10c relative to the plane P (see FIG. 1). The spider thus has a first set of four stiffeners 20 on one side of the concave portion 10c, and a second set of four stiffeners 20 on the other side of the concave portion 10c.

Each stiffener 20 has a body 20c, a first lateral flange 20a and a second lateral flange 20b. By way of example, the stiffener is made from a metal plate in which the portions that form the first and second lateral flanges 20a and 20b are folded relative to the body 20c. Consequently, the first and second lateral flanges 20a and 20b extend perpendicularly relative to the body 20. In addition, each lateral flange 20a and 20b includes a notch 20d such that, when seen perpendicularly to the lateral flanges 20a or 20b, the first and second lateral flanges 20a and 20b are of smaller height in their notches 20d. The first and second lateral flanges 20a and 20b may also include a plurality of orifices 20e. In this example, each of the first and second lateral flanges 20a and 20b has two orifices 20e such that for the two sets of four stiffeners, each lateral flange 20a, 20b of each stiffener 20 is fastened to a lateral flange of an adjacent stiffener.

The stiffeners 20 are fastened to the bracket 10 by means of bolts 40. Each bolt 40 serves to assemble and fasten together two adjacent brackets 10 and two adjacent stiffeners 20 by passing through coinciding orifices 10d and 20e. In the present example, when the various components of the cardan joint spider are assembled together, the first respective lateral flanges 20a of two adjacent stiffeners are in contact with each other. Thus, assembling and fastening together the respective first arms 10a of two adjacent brackets by means of a bolt 40 also serves to fasten together said first lateral flanges 20a by means of the same bolt 40.

Furthermore, the presence of the notched portions 20d serves to release the space needed for inserting the shaft 30 between the arms of the two adjacent brackets to which two stiffeners 20 are fastened on either side of the concave portions 10c (see dashed lines in FIG. 3). Thus, tightening the bolts 40 also serves to hold (clamp) the shaft 30, which is sandwiched between the arms of two adjacent brackets, being received in the concave portions 10c of said arms.

Although the present invention is described with reference to specific embodiments, it is clear that modifications and changes may be undertaken on those examples without going beyond the general ambit of the invention as defined by the claims. In particular, individual characteristics of the various embodiments shown and/or mentioned may be combined in additional embodiments. Consequently, the description and the drawings should be considered in a sense that is illustrative rather than restrictive.

The invention claimed is:

1. A cardan joint spider comprising a body having four right-angled brackets, each bracket presenting two mutually perpendicular arms, an arm of one bracket being assembled to an arm of an adjacent bracket so as to form a cross-shaped spider having four branches the body including at least four stiffeners, a stiffener being mounted between the two arms of each bracket, wherein each stiffener is fastened to each arm of a bracket by means of at least two bolts.

2. The spider according to claim 1, wherein two adjacent brackets are assembled together by the at least two bolts.

3. The spider according to claim 1, wherein a distance between the at least two bolts through a given arm is greater than or equal to 30% of the length of the arm.

4. The spider according to claim 1, including four shafts, each branch of the spider carrying a respective shaft mounted between two arms of two adjacent brackets.

5. The spider according to claim 4, wherein each arm of each bracket includes a portion configured to receive a shaft in part.

6. The spider according to claim 5, wherein the body has eight stiffeners, with two stiffeners being fastened to each bracket on respective sides, with respect to the axial direction of the shaft, of the portion configured to receive a shaft in part.

7. The spider according to claim 1, wherein each bracket is made of folded sheet metal.

8. A rocket engine including at least one cardan joint spider according to claim 1.

* * * * *